(12) United States Patent
Schurba et al.

(10) Patent No.: US 10,773,888 B2
(45) Date of Patent: Sep. 15, 2020

(54) DRIVE CARRIAGE FOR A TRANSPORT DEVICE, AND TRANSPORT SYSTEM

(71) Applicant: EISENMANN SE, Boeblingen (DE)

(72) Inventors: Alexander Schurba, Sindelfingen (DE); Ulrich Hofbauer, Gaeufelden (DE); Eckhard Riemrich, Rottenburg (DE)

(73) Assignee: EISENMANN SE, Boeblingen (DE)

( * ) Notice: Subject to any disclaimer, the term of this patent is extended or adjusted under 35 U.S.C. 154(b) by 350 days.

(21) Appl. No.: 15/326,579

(22) PCT Filed: Feb. 14, 2015

(86) PCT No.: PCT/EP2015/000329
§ 371 (c)(1),
(2) Date: Jan. 16, 2017

(87) PCT Pub. No.: WO2016/008552
PCT Pub. Date: Jan. 21, 2016

(65) Prior Publication Data
US 2017/0203919 A1    Jul. 20, 2017

(30) Foreign Application Priority Data
Jul. 16, 2014   (DE) ........................ 10 2014 010 556

(51) Int. Cl.
*B61B 3/00* (2006.01)
*B65G 1/04* (2006.01)
(Continued)

(52) U.S. Cl.
CPC .............. *B65G 1/0457* (2013.01); *B61B 3/00* (2013.01); *B61B 3/02* (2013.01); *F16H 19/04* (2013.01)

(58) Field of Classification Search
CPC ......... H01L 21/67733; H01L 21/67736; H01L 21/67775; H01L 21/67724;
(Continued)

(56) References Cited

U.S. PATENT DOCUMENTS 2,499,442 A    3/1950 Wright
3,762,531 A *  10/1973 Lee ...................... B65G 1/0435
                                                    414/280
(Continued)

FOREIGN PATENT DOCUMENTS

DE    120571    5/1901
DE    429119    5/1926
(Continued)

*Primary Examiner* — Mark T Le
(74) *Attorney, Agent, or Firm* — Schroeder Intellectual Property Law Group, LLC

(57) ABSTRACT

A drive carriage for a transport device, which drive carriage has an undercarriage, by means of which the drive carriage is movable along a drive rail. The drive carriage has a frame structure connected to the undercarriage, a slide supported by the frame structure and at least one driver which is coupleable to the transport device. The slide and the driver are mounted so as to be displaceable in relation to the frame structure. In addition, a transport system with such a drive carriage and with at least one transport device for an item to be transported is specified, in which the transport device is supported by at least one supporting carriage and the transport device has a driver which is coupleable to the driver of the drive carriage.

19 Claims, 14 Drawing Sheets

(51) Int. Cl.
*B61B 3/02* (2006.01)
*F16H 19/04* (2006.01)

(58) Field of Classification Search
CPC ......... H01L 21/67766; H01L 21/67379; B61B 3/02; B61B 13/04; B61B 3/00; B61B 5/02; B65G 1/0457; B65G 1/0435; B65G 47/04; F16H 19/04
USPC .......................................................... 104/48
See application file for complete search history.

(56) References Cited

U.S. PATENT DOCUMENTS

| | | | |
|---|---|---|---|
| 4,395,180 A * | 7/1983 | Magnotte | B66C 7/14 104/127 |
| 4,771,697 A * | 9/1988 | Dehne | B61B 10/022 104/172.4 |
| 4,943,120 A * | 7/1990 | Groger | E21C 27/02 105/29.1 |
| 6,178,891 B1 | 1/2001 | Ostholt et al. | |
| 7,467,723 B2 * | 12/2008 | Zaguroli, Jr. | B66C 9/14 212/331 |
| 7,753,639 B2 * | 7/2010 | Hoshino | B65G 1/0457 414/270 |
| 7,802,337 B2 * | 9/2010 | van Roosmalen | A61G 3/061 105/425 |
| 2012/0076623 A1 | 3/2012 | Kasuya | |
| 2013/0134120 A1 * | 5/2013 | Won | B66C 19/00 212/328 |

FOREIGN PATENT DOCUMENTS

| | | |
|---|---|---|
| DE | 464233 | 8/1928 |
| DE | 7310310 U | 11/1974 |
| DE | 198 02 186 C1 | 3/1999 |
| DE | 199 53 715 C2 | 12/2001 |
| DE | 10 2008 049 975 A1 | 4/2010 |
| EP | 2 172 380 A1 | 4/2010 |
| FR | 1.353.039 | 1/1964 |
| FR | 2 913 653 | 9/2008 |

* cited by examiner

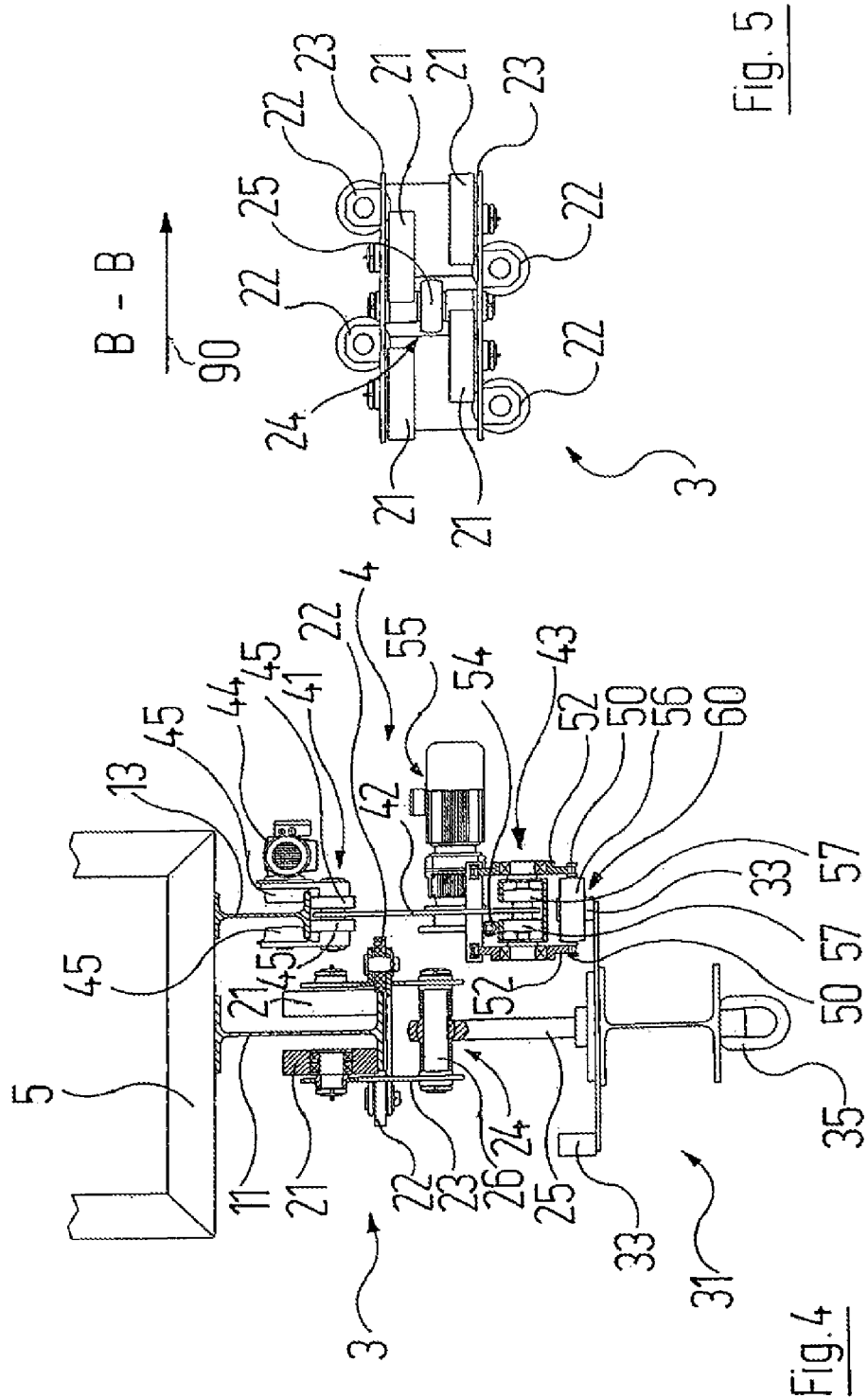

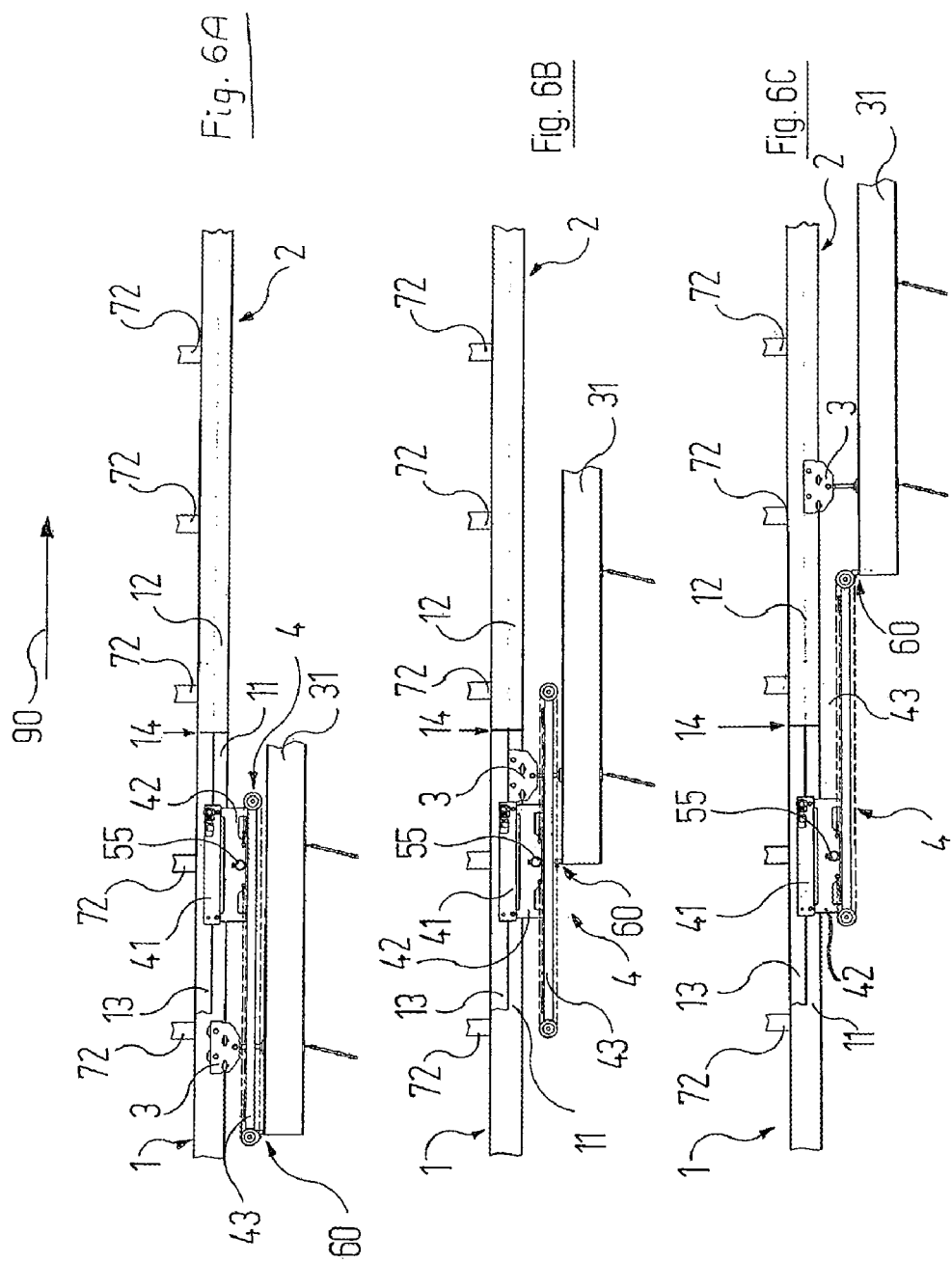

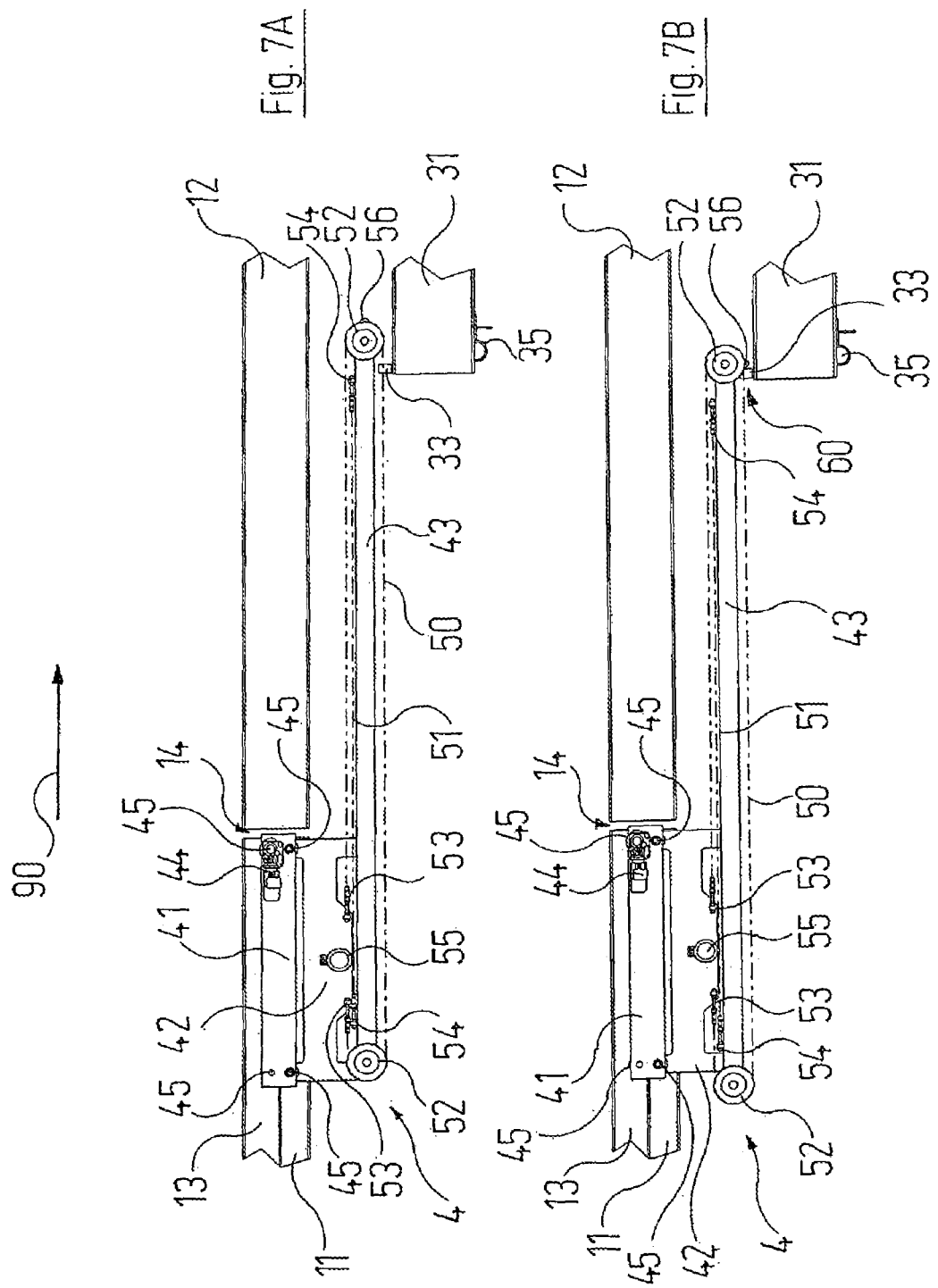

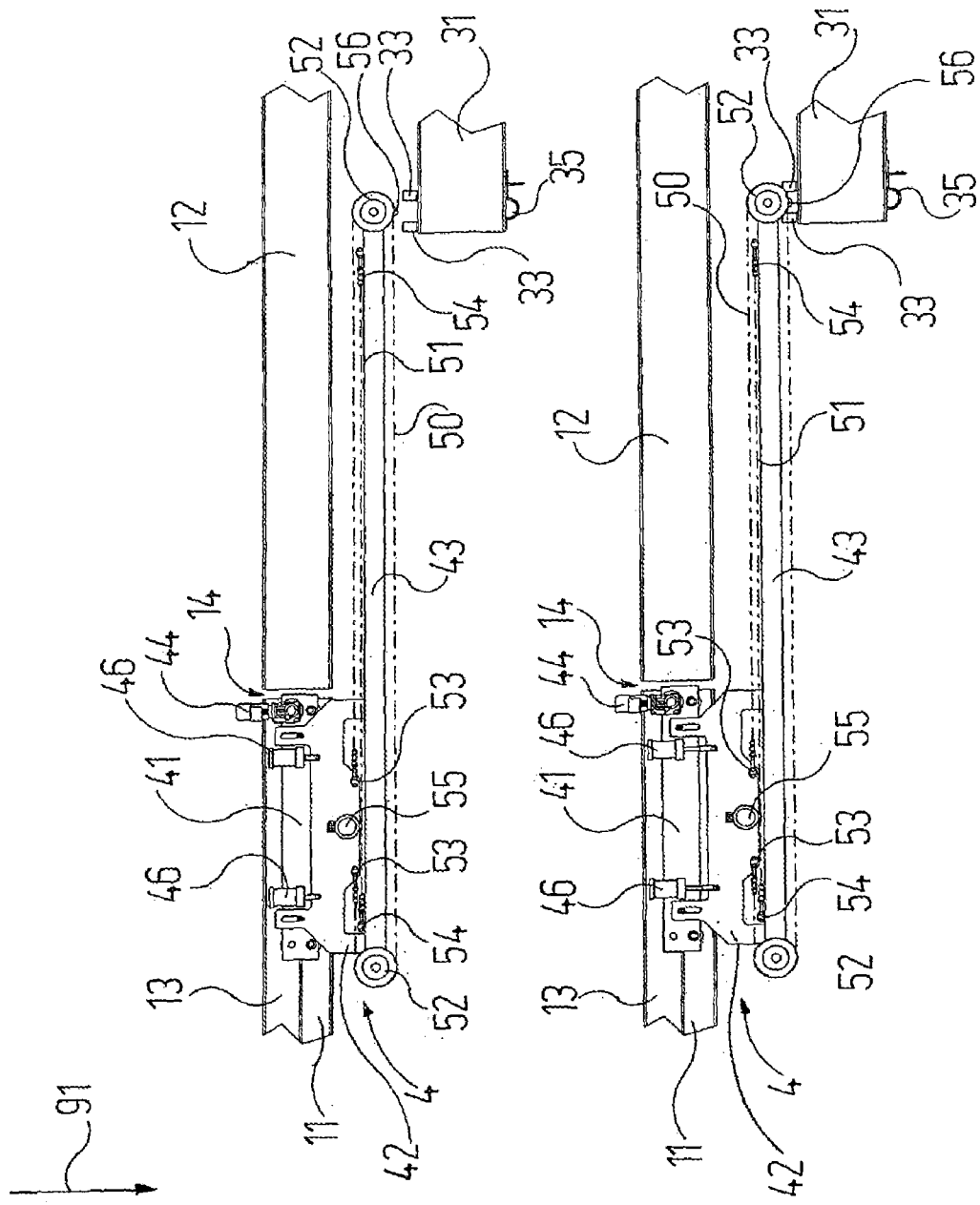

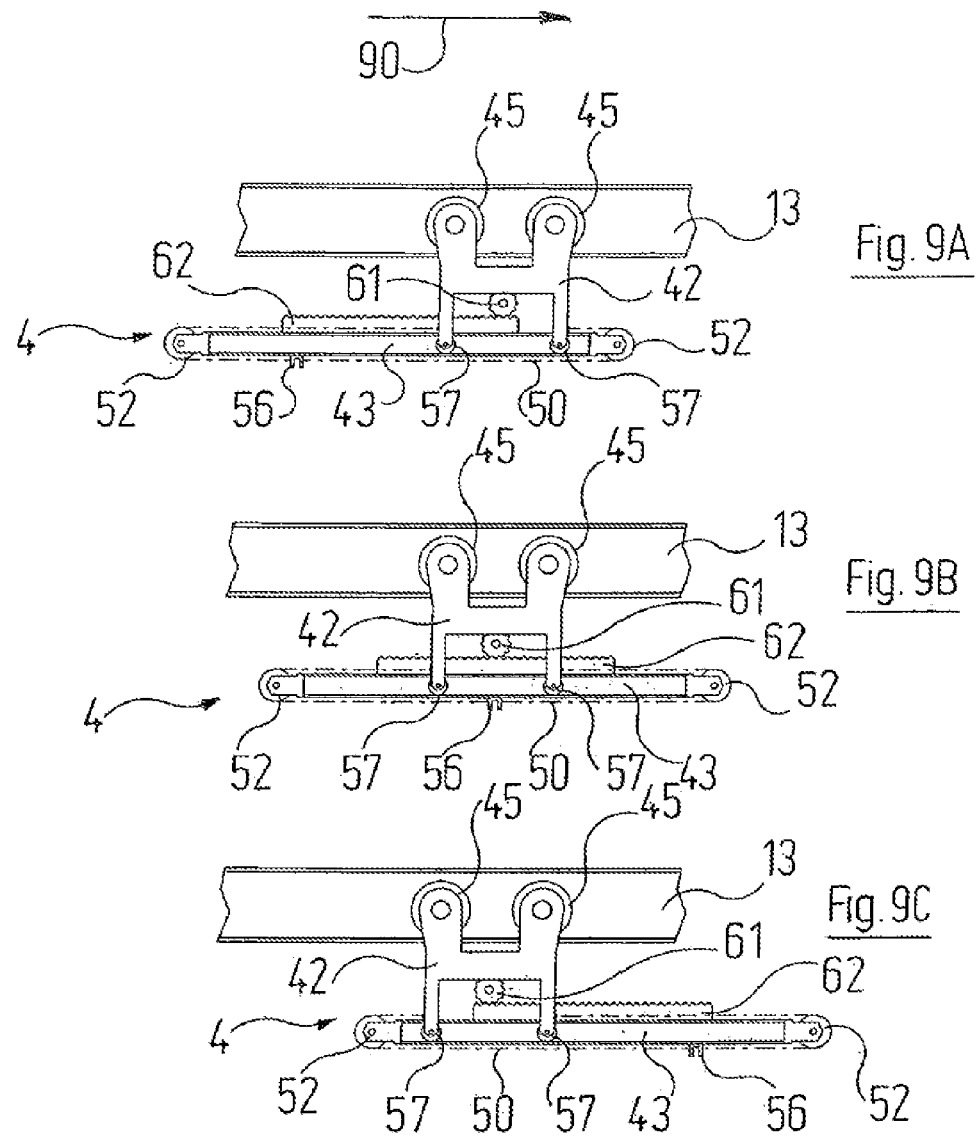

DRIVE CARRIAGE FOR A TRANSPORT DEVICE, AND TRANSPORT SYSTEM

RELATED APPLICATIONS

This application is a national phase of International Patent Application No. PCT/EP2015/000329, filed Feb. 14, 2015, which claims the filing benefit of German Patent Application No. 10 2014 010 556.3, filed Jul. 16, 2014, the contents of both of which are incorporated herein by reference.

FIELD OF THE INVENTION

The invention relates to a drive carriage for a transport device, which drive carriage comprises an undercarriage, by means of which the drive carriage is movable along a drive rail.

The invention also relates to a transport system comprising a drive carriage and comprising at least one transport device for an item to be transported.

BACKGROUND OF THE INVENTION

An electric overhead conveyor for transporting objects, comprising a supporting rail and comprising a supporting carriage is known from DE 10 2008 049 975 A1. Here, the supporting carriage is provided with an undercarriage which receives a load and which comprises at least one driven drive roller.

DE 198 02 186 C1 discloses an overhead conveyor comprising at least one undercarriage movable on rails, comprising a drivable running wheel and comprising at least two frictional wheels distanced from one another and resting on the running wheel distanced from one another in the direction of travel.

In the case of transport tasks in a facility, for example an industrial facility, specific problems may occur. By way of example, sets of carriages for items to be transported are usually displaced from a transfer bridge into a facility area, for example a parked position or a processing apparatus, using what are known as push-pull units or tractors. A transfer bridge can be designed to travel to a number of facility areas. The parked positions can be arranged on both sides of the transfer bridge. A known disadvantage when transporting sets of carriages from one side of the transfer bridge to the opposite side is the presence of rate limitations. A further disadvantage is considered to be the fact that, for example when transporting items into a furnace, sensitive drive components are exposed to high temperatures, which can lead to a reduction of the service life of the drive components.

SUMMARY OF THE INVENTION

An object of the invention is to further develop a drive carriage for a transport device and a transport system, and for example to reduce the occurrence of rate limitations.

This object may be achieved in the case of a drive carriage of the type described in the introduction in that
a) the drive carriage has a frame structure connected to the undercarriage, a slide supported by the frame structure, and at least one driver which can be coupled to the transport device;
b) the slide and the driver are mounted so as to be displaceable in relation to the frame structure.

A drive that can be used in a versatile manner in different scenarios for the transport device is thus provided. Furthermore, the availability is increased and undesirable rate limitations can be avoided.

In an advantageous development the driver is mounted so as to be displaceable in relation to the frame structure and parallel to the drive rail. With the aid of the gear arrangement displacing the driver relative to the frame structure and the undercarriage, it is thus made possible for example to transfer the transport device into an area of the facility in which no drive rails or a stationary drive rail or drive elements for the drive carriage are provided.

In order to further improve the availability for the material flow between areas of the facility, the drive carriage can preferably comprise a gear arrangement for moving the driver, wherein the driver is movable by means of the gear arrangement in two movement directions opposite one another, and wherein the gear arrangement is designed functionally symmetrically in respect of the movement directions of the driver.

An improved functionality can be achieved when the driver is mounted on the slide in such a way that the driver is movable relative to the slide.

A gear arrangement having a motor for moving the slide and the driver is preferably provided, wherein the gear arrangement is designed in such a way that the driver is moved relative to the slide when the slide is displaced relative to the frame structure. A kinematic coupling of this type enables a particularly compact design of the drive carriage.

A stable and compact embodiment can make it possible for the driver to be connected to at least one chain, which is guided movably around the slide and is fixed to the frame structure of the drive carriage.

In order to move specific transport devices in an operationally reliable manner, it may be advantageous to provide a rack-and-opinion gear in order to displace the slide in relation to the frame structure of the drive carriage.

The stability of the construction can preferably be further improved in that the rack-and-pinion gear has a gearwheel on the side of the frame structure and has a rack on the side of the slide.

In order to displace the slide in relation to the frame structure, a gear having a chain connected to the slide is preferably provided, wherein the chain is fixed to the slide.

The frame structure of the drive carriage can advantageously be mounted so as to be vertically displaceable in relation to the undercarriage. The operational reliability can be improved in this way.

When the frame structure is mounted so as to be movable horizontally in relation to the undercarriage, it is thus made possible for the drive carriage to cooperate with a plurality of transport devices, which increases the conveying efficiency, in particular when exchanging items to be transported in a dryer or the like.

Here, the frame structure is preferably mounted so as to be displaceable horizontally in relation to the undercarriage or pivotable in relation to the undercarriage about a horizontal pivot axis.

The object may be achieved in the case of a transport system of the type described in the introduction in that
a) the transport device is supported by at least one supporting carriage;
b) the transport device comprises a driver, which can be coupled to the driver of the drive carriage.

In this way, a transport system is provided which is characterized by high availability and stability. The transport system is further characterized by a drive which can be used in a versatile manner and which enables the use of supporting carriages in a compact and maintenance-friendly design.

The at least one supporting carriage advantageously comprises at least four supporting rollers, of which the axes are arranged parallel and offset to one another. The supporting carriages can thus move unhindered over irregular route sections, for example traversing a gap between two rail pieces distanced from one another.

In order to further increase the smooth and quiet running of the supporting carriage, the at least one supporting carriage can comprise at least four guide rollers, of which the axes are arranged parallel and offset to one another.

For specific items to be transported, for example for relatively long and heavy parts, it may be expedient for the transport device to be hung from at least two supporting carriages.

At least one rail system can preferably be provided which has a supporting rail for guiding the at least one supporting carriage and a drive rail for guiding the at least one drive carriage. This enables a particularly flexible use of the transport system and also increases the ease of maintenance.

In view of the possible cooperation of the drive carriage with a number of transport systems, it is favorable when the primary rail system comprises two supporting rails which run parallel to one another, wherein the frame structure of the drive carriage is mounted so as to be movable horizontally relative to the two supporting rails.

In addition, it is then advantageous if the frame structure of the drive carriage is mounted so as to be displaceable horizontally and perpendicularly relative to the two supporting rails or pivotably about a pivot axis which runs parallel to the two supporting rails.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWING

FIG. 4 shows a sectional view according to the line of section A-A in FIG. 1;

FIG. 5 shows a sectional view according to the line of section B-B in FIG. 2;

FIGS. 6A, 6B, 6C show a transfer process into a facility area;

FIGS. 7A, 7B show a drive carriage with a driver;

FIGS. 8A, 8B show a drive carriage with a vertically displaceable frame;

FIGS. 9A, 9B, 9C show a drive carriage with a rack-and-pinion gear;

DETAILED DESCRIPTION OF THE PRESENT INVENTION

Figure 1:
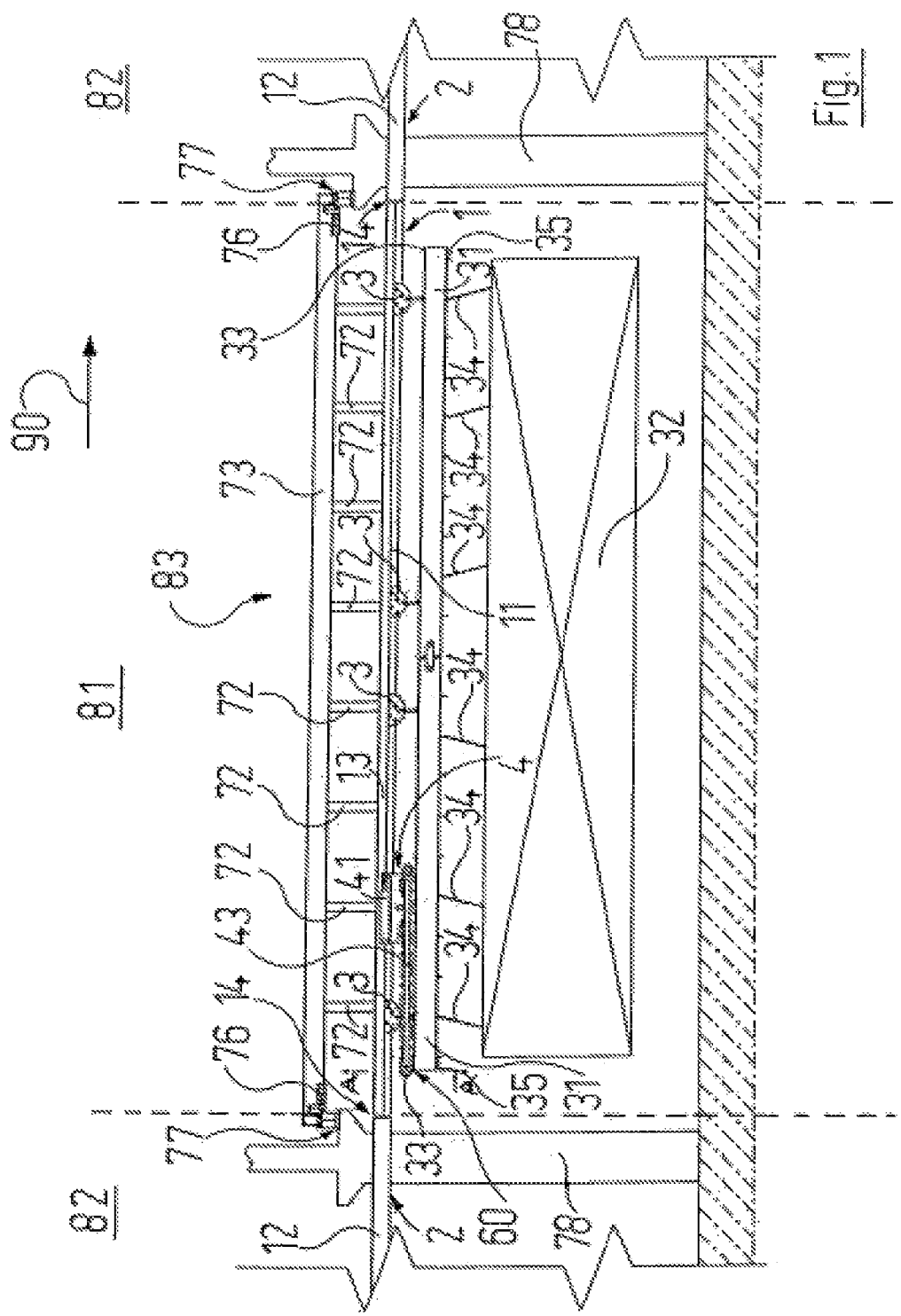
FIG. 1 shows a facility comprising a transfer bridge and a transport system.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
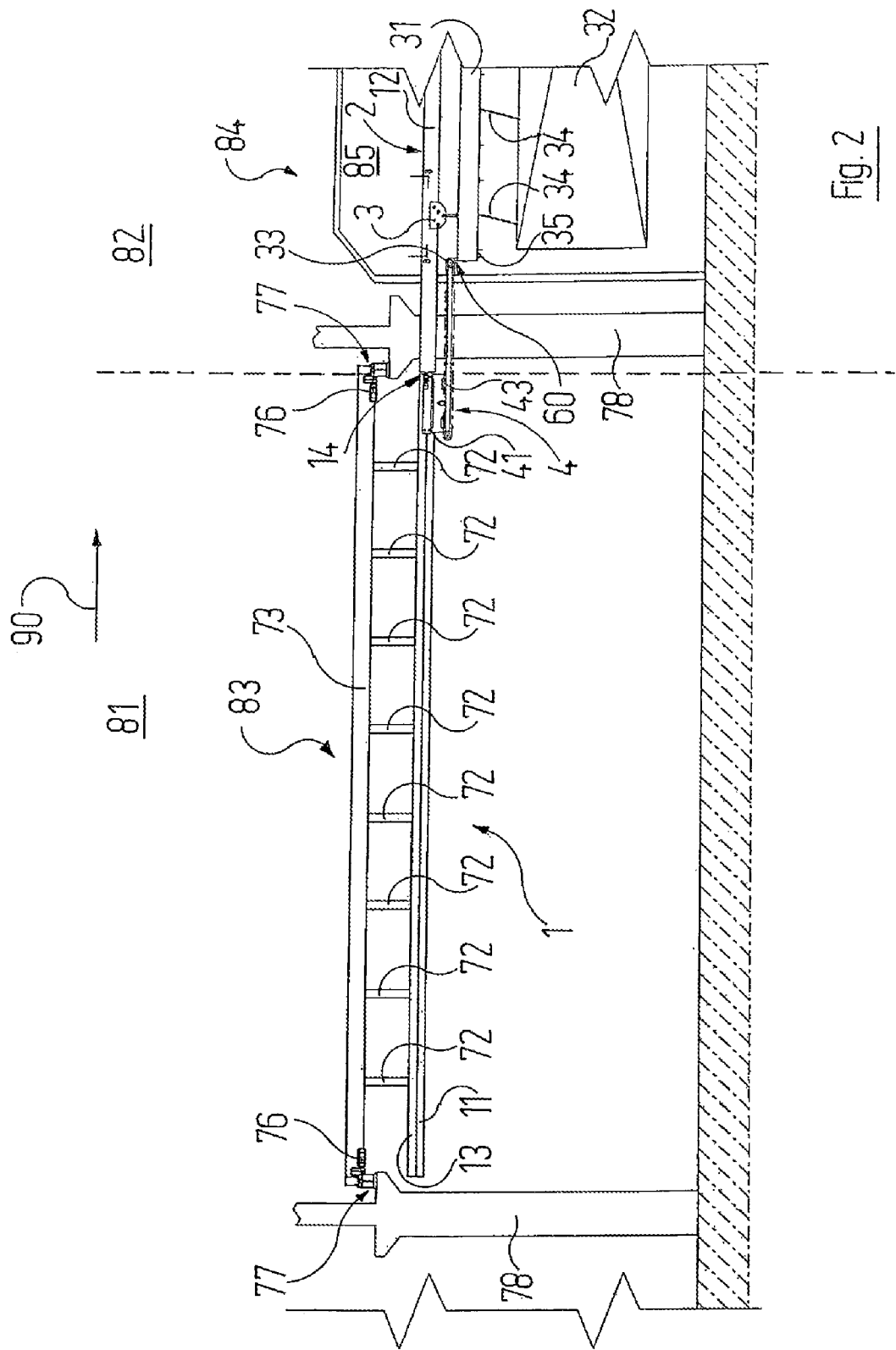
FIG. 2 shows a facility comprising a transfer bridge and comprising a dryer and a transport system.
Figure 3:
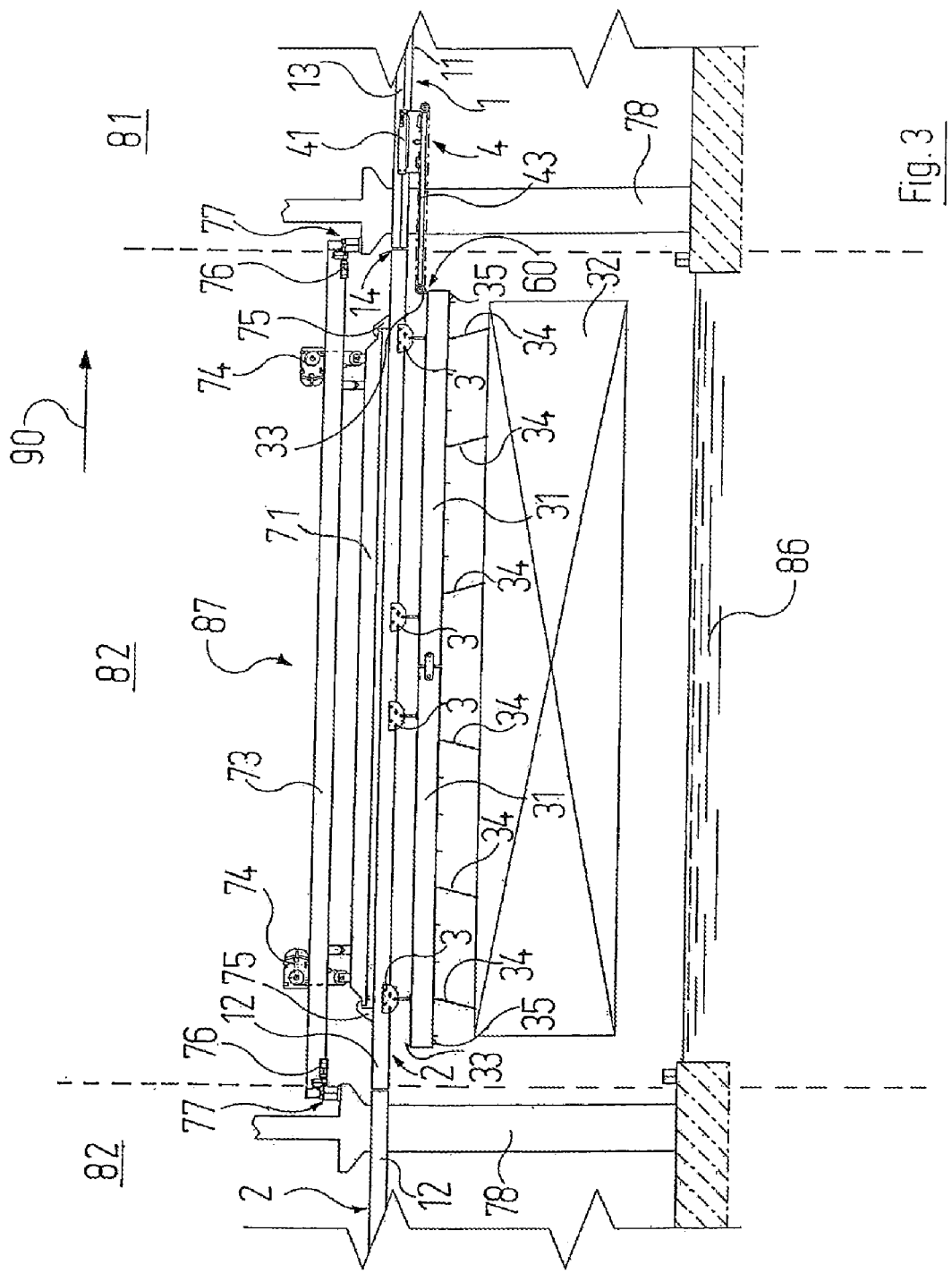
FIG. 3 shows a system comprising an immersion bath and a transport system.

FIGS. 1 to 3 show examples for a facility, for example an industrial facility, comprising a transport system. In the shown examples the facility has a first facility area 81 with a primary rail system 1 and one or more further facility areas 82. A further facility area 82 has at least one secondary rail system 2.

Items to be transported 32 can be moved along the primary and secondary rail systems 1 and 2 respectively, which have been shown at least in part in the examples. Items to be transported 32 can be parts of an industrial facility, for example. The items to be transported 32 are transported with the aid of a transport device 31, as is shown by way of example. In the shown example, suspension links 34 are provided on the transport device 31 for suspension of the items to be transported 32 and are preferably connected in a hinged manner to the transport device 31. It is also possible to design the transport device in such a way that the items to be transported can be set down for example on a surface of the transport device. In a further exemplary embodiment it is possible for the transport device to have a container for the items to be transported.

The examples according to FIGS. 1 to 3 show a transport device 31 which is connected to a number of supporting carriages 3 which support the transport device 31. The supporting carriages 3 can be moved on supporting rails 11, 12. The supporting rails 11, 12 are designed to support the supporting carriages 3. Via said carriages, the supporting rails 11, 12 take on the load of said carriages 3 and the load of the transport device 31 with the items to be transported 32.

In the shown examples there is a gap 14 between the supporting rail 11 of the primary rail system 1 and the supporting rail 12 of the secondary rail system 2. If a supporting carriage 3 switches from one rail system 1, 2 into an adjacent rail system 2 or 1, it crosses a gap 14 of this type. FIG. 1 also shows a gap 14 between the supporting rails 12 of the two secondary systems 2.

A multi-part transport device 31 which is suspended from four supporting carriages 3 is indicated in FIGS. 1 and 3. A transport device 31 can be formed in one or more parts. In accordance with the sketched arrangement, one or more transport devices 31 with a plurality of supporting carriages 3 can form a set of carriages.

In the shown examples a drive carriage 4 is provided in order to move the transport devices 31. The drive carriage 4 has an undercarriage 41 and a slide 43. The undercarriage 41 of the drive carriage 4 is arranged on a drive rail 13. The drive carriage 4 can be moved along the drive rail 13. In order to move the drive carriage 4 along the drive rail 13, a motor 44 (see FIG. 4) is provided, which moves the undercarriage 41 relative to the drive rail 13. The slide 43 can be moved by means of a motor 55 (see FIG. 4) relative to the undercarriage 41. In the example, the slide 43 can be displaced relative to the undercarriage 41 along the drive rail 13 by means of the motor 55.

The drive carriage 4 can travel on the drive rail 13 in the primary rail system 1. The supporting carriages 3 can travel on the supporting rails 11, 12.

So that the drive carriage 4 can move the transport device 31, a coupling device 60 can be formed, which in a coupled state connects the drive carriage 4 in the region of the slide 43 to the transport device 31. On the one hand, when the coupling device 60 is in a coupled state, the transport device 31 can be moved by moving the undercarriage 41 of the drive carriage 4 relative to the drive rail 13, i.e. the motor 44 (see FIG. 4) drives the drive carriage 4. Here, the coupling device 60 moves jointly with the drive carriage 4 or in accordance with the movement of the undercarriage 41 of the drive carriage 4 along the drive rail 13. On the other hand, the transport device 31 in the coupled state of the coupling device 60 can be moved by moving the coupling device 60 relative to the undercarriage 41 and parallel to the drive rail 13, i.e. the motor 55 drives the slide 43.

The coupling device 60 comprises coupling elements, which establish the coupling as a result of their cooperation. At least one coupling element is arranged on the side of the transport device 31, and at least one coupling element is arranged on the side of the drive carriage 4. The coupling of the drive carriage 4 to the transport device 31 can be produced by connection of the coupling elements and can be released by separation of the coupling elements. At least one driver 33 can be provided as coupling element on the side of the transport device 31. When a transport device 31 having a number of drivers 33 is provided, the drive carriage 4 can be coupled to the transport device 31 at various points of said transport device. The flexible availability of the drive carriage 4 for the material flow area can thus be improved. The transport device 31 shown by way of example comprises two drivers 33, which are each arranged in an end region along the longitudinal axis of the transport device 31. This longitudinal axis is parallel to the arrow 90 in the drawings.

FIGS. 1 and 2 show examples in which the drive carriage 4 is arranged so as to be movable along a primary rail system 1. What is shown is a transfer bridge 83 with a primary rail system 1 in a first facility area 81. The transfer bridge 83 comprises a crossmember 73, which is movable along a rail system 77. This rail system 77 is arranged on both sides of the crossmember 73. In order to move the crossmember 73, at least one drive 76 cooperates with the rail system 77. In the shown examples the drive carriage 4 is arranged so as to be movable jointly with the crossmember 73 of the transfer bridge. The supporting carriage can thus be positioned adjacently to a multiplicity of facility areas. The transfer bridge 73 can be connected for example to a supportive supporting structure 78. In the shown example the drive 76 for moving the crossmember 73 has a motor on each of the two sides of the crossmember 73. Supporting elements 72 are provided, which hold the primary rail system 1 on the crossmember 73. Due to the arrangement of the supporting elements 72, the supporting rail 11 and the drive rail 13 of the primary rail system 1 are supported by the crossmember 73. In the examples, both rail systems 1, 2 are arranged at a height distanced from the ground.

As indicated in FIG. 1, secondary rail systems 2 can be arranged on both sides of the primary rail system 1. The secondary rail systems 2 can be associated with parked positions, transport routes, processing positions and/or treatment positions, for example. In FIG. 2 the secondary rail system 2 is associated for example with a dryer 84 and leads into the interior 85 thereof.

A transport device 31 can be moved from a first position, as is illustrated in FIG. 1, into a second position, as is illustrated in FIG. 2, as follows: a prerequisite is that the transport device 31 is coupled to the drive carriage 4 via the coupling device 60. In a first method step the undercarriage 41 of the drive carriage 4 moves the drive carriage 4 and the transport device 31 coupled to the drive carriage 4 in the direction the arrow 90. In a second method step the transport device 31 is moved relative to the undercarriage 41 in the direction of the arrow 90, wherein the coupling device 60 moves relative to the undercarriage 41 of the drive carriage 4. The two method steps can be performed in chronological succession or in a manner overlapping chronologically at least in part.

By moving the coupling device 60 relative to the undercarriage 41 of the drive carriage 4, the supporting carriages 3 can be moved from the primary rail system 1 into the secondary rail system 2, whereas the drive carriage 4 remains in the primary rail system 1. An extremely operationally reliable transfer of the transport device 31 or of the items to be transported from the first facility area 81 into the further facility area 82 is thus performed. The drive carriage may thus remain in an area which for example is protected against high temperatures, as can occur for example in a furnace or dryer 84, or against aggressive media, which for example may occur in the region of an immersion bath 86 (see FIG. 3).

The drive carriage 4 is preferably constructed so as to be functionally symmetrical, wherein provision is made in particular so that the coupling device 60 can be displaced in two opposite directions relative to the undercarriage 41 of the drive carriage 4. By way of example, it is thus made possible that a transport device 31 can be transferred from a first facility area into a further facility area 82 both in the direction of the arrow 90 (see FIG. 2) and against the direction of the arrow 90 (see FIG. 3).

In FIG. 3 the primary rail system 1, by contrast with that shown in FIGS. 1 and 2, is not associated with a transfer bridge 83, but instead is arranged in a stationary manner in the further facility area 82. FIG. 3 shows a further facility area 82 with the secondary rail system 2 and an immersion bath 86 for treating the items to be transported 32, and with a hoisting apparatus 87. With the aid of the hoisting apparatus 87, the items to be transported 32 can be lowered into the immersion bath 86 or raised from the immersion bath 86. The supporting rail 12 of the secondary rail system 2 is connected via a plurality of holding devices 75 to a support 71, which is in turn supported by the crossmember 73. A supportive supporting structure 78 is provided for the crossmember 73. The crossmember 73 is formed as part of the hoisting apparatus 87 and is provided with drive devices 74 for vertically moving the support 71. By vertically moving the support 71 and the supporting rail 12 connected to the support 71, the items to be transported 32 can be raised and lowered.

The hoisting apparatus 87 shown in FIG. 3, similarly to the transfer bridge 83 (see FIGS. 1 and 2), can have a rail system 77 and a drive 76 for moving the crossmember 73.

As indicated in FIGS. 1 to 3, a transport device 31 can also have one or more receiving elements 35, which can be engaged by drive devices of the conventional type, for example tractors or push-pull units. This enables a sort of mixed operation, for example in different areas of a facility, wherein the transport device 31 can be moved by the drive carriage 4 and/or by a drive device in the conventional way. A receiving element 35 is also indicated by way of example in FIGS. 4, 7A, 7B, 8A and 8B.

FIG. 4, in a sectional view, shows the structure of the supporting carriage 3 and of the drive carriage 4 in accordance with the line of section A-A in FIG. 1.

The supporting carriage 3 comprises the load-bearing supporting rollers 21, which roll over a running surface of the supporting rail 11. The axes of rotation of the supporting rollers 21 run in a horizontal plane perpendicularly to the supporting rail 11. The supporting carriage 3 in the example additionally comprises lateral guide rollers 22, which can rotate about axes running perpendicularly to the running surface for the supporting rollers 21. The supporting carriage 3 comprises an undercarriage frame 23, via which the supporting rollers 21 and the guide rollers 22 are connected. In the shown example a hinged mount for a suspension assembly 25 is arranged in the lower region of the undercarriage frame 23 of the supporting carriage 3. The mount 24 for the suspension assembly 25 of the transport device 31 is preferably connected to the supporting carriage 3 such that it can be coupled and decoupled, wherein the hinged mount 25 has an axis of rotation 26. Because the transport device 31 (see FIG. 1 in particular) is suspended in a hinged manner from a plurality of supporting carriages 3, a defined supporting roller loading can be achieved.

The supporting rollers 21 and guide rollers 22 of the supporting carriage 3 can be arranged so as to be easily accessible for any inspection and/or maintenance.

The supporting rail 11, on which the supporting carriage 3 runs, runs parallel to the drive rail 13, on which the drive carriage 4 runs. The supporting rail 11 and the drive rail 13 can be connected to a common support 5 (not illustrated in greater detail in FIG. 1), which can be held by a crossmember 73 (see FIGS. 1 and 2).

The undercarriage 41 of the drive carriage 4 comprises a plurality of rollers 45, which roll over running surfaces of the drive rail 13. A motor 44 is provided in order to drive at least one of these rollers 45. The undercarriage 41 is connected to a frame structure 42, which will be referred to hereinafter as a frame 42 for the sake of simplicity. Rollers 57 are provided in the lower region of the frame 42 and support the slide 43 of the drive carriage 4. The slide 43 can be displaced in relation to the frame 42 and the undercarriage 41 of the drive carriage 4, wherein the slide 43 can be displaced in or against the direction of the arrow 90 (see FIGS. 1 to 3 in particular).

A gear arrangement is provided in order to displace the slide 43 in relation to the frame 42 and the undercarriage 41. This gear arrangement can comprise at least one first chain 50 and at least one second chain (see FIGS. 7A, 7B, 8A, 8B). In the shown example two first chains 50 are provided, which are arranged movably on the slide 43 with facilitation of deflection rollers 52. The first chains 50 are fixed to the frame 42 of the drive carriage 4. In the example, the second chain 51, as is also visible in other views (see FIGS. 7A, 7B, 8A, 8B), is fixed to the slide 43. Chain tensioners 54 are provided in order to fix the second chain 51 to the slide 43. By means of a motor 55 acting on the second chain 51, the slide 43 can be displaced in or against the direction of the arrow 90 (see FIGS. 1 to 3 in particular) relative to the frame 42. Here, the first chains 50 and at least one driver 56 connected thereto are also removed.

The driver 56 is arranged between the two first chains and is entrained by the two first chains 50. The driver 56 can be coupled to a driver 33 of the transport device 31, wherein the drivers 33, 56 can form a coupling device 60 in that the driver 56 arranged on the first chains 50 of the drive carriage 4 engages the driver 33 of the transport device 31. The transport device 31 can comprise a plurality of drivers 33. In the shown example drivers 33 are provided on both sides of the suspension assembly 25 of the transport device 31. The material flow can thus be made more flexible.

In terms of design, it may be advantageous to arrange the deflection rollers 52 on the slide 43 in such a way that the axes of said rollers are oriented differently than in the example according to FIG. 4. By way of example, the axes of the deflection rollers 52 can be oriented parallel to the axes of the guide rollers 22 of the supporting carriage 3.

FIG. 5 shows the supporting carriage 3 in a sectional view in accordance with the line of section B-B in FIG. 2. The supporting carriage 3 with the supporting rollers 21 and guide rollers 22 arranged on the undercarriage frame 23 is designed to be moved in or against the direction of the arrow 90. The hinged mount 24 for the suspension assembly 25 is also indicated in the example.

In the example, both the supporting rollers 21 and the guide rollers 22 of the supporting carriage 3 are arranged offset to one another. The supporting rollers 21 and the guide rollers 22 are in particular offset as shown along the direction of the arrow 90. Due to the shown arrangement of the supporting rollers 21 and the guide rollers 22, the driving stability of the supporting carriage 3 is increased. In particular, the supporting carriage can travel smoothly over a gap 14 for example (see FIGS. 1 to 3 inter alia), wherein, in accordance with the shown example, at least three of the four supporting rollers 21 always rest with contact against a rail or at least three of the four guide rollers 22 guide with abutment against a rail. Even large gaps 14, as can occur for example with use of indoor cranes, can thus be traversed without difficulty. The suspension assembly 25 arranged in a hinged manner can also have an advantageous effect in this respect.

FIGS. 6A, 6B, 6C show the transfer of a supporting carriage 3 from a primary rail system 1 with the supporting rail 11 into a secondary rail system 2 with the supporting rail 12. In the shown example the gap 14 is arranged between the supporting rails 11, 12 distanced from one another. The primary rail system 1 additionally comprises the drive rail 13 with the drive carriage 4. In the shown example, supporting elements 72 for the rails are provided in both rail systems 1, 2.

In the shown example the drive carriage 4 is coupled via the coupling device 60 to the transport device 31 and is thus also coupled to the supporting carriage 3 connected to the transport device 31. The motor 55 arranged on the frame 42 of the drive carriage 4 moves the coupling device 60 from the position shown in FIG. 6A via the position shown in FIG. 6B into the position shown in FIG. 6C in the direction of the arrow 90. The coupling device 60 here moves the transport device 31 and the supporting carriage 3 in an entrained manner. In the shown example the undercarriage 41 of the driver carriage 4 is not moved during the transfer of the supporting carriage 3, i.e. the undercarriage 41 is not moved relative to the drive rail 13 during the transfer of the supporting carriage 3. During the transfer, the motor 55 moves the coupling device 60 with facilitation of a first chain 50 (see FIGS. 7A and 7B in particular), wherein the motor 55 moves the slide 43 via a second chain 51 (see FIGS. 7A and 7B in particular). Here, the motor 55 acts on the second chain 51, wherein the movements of the coupling device 60 and of the slide 43 are coupled with one another.

It can be seen from the drawings that, with the movement sequence illustrated in FIGS. 6A, 6B, 6C, the path over which the coupling device 60 is displaced is greater than the path over which the slide 43 is displaced. The use of just one motor 55 is sufficient for the movement sequence shown here.

FIGS. 7A, 7B and 8A, 8B show two supporting rails 11, 12, separated by the gap 14, for a supporting carriage not illustrated in greater detail (see FIGS. 6A, 6B, 6C in particular) of a transport device 31. The at least one driver 33 is arranged on the transport device 31. The undercarriage 41 of the drive carriage 4 runs on the drive rail 13, which is arranged parallel to the supporting rail 11. In the shown example one of the rollers 45 (not provided with reference signs in FIGS. 8A and 8B for reasons of clarity), here one of the two upper rollers, of the drive carriage 4 can be driven by a motor 44, preferably an electric motor. The undercarriage 41 of the drive carriage 4 is connected to the frame 42. The at least one first chain 50 is fixed to the frame 42 with facilitation of two chain tensioners 53. The at least one first chain 50 is guided movably around the slide 43 with use of two deflection rollers 52. A driver 56 is arranged on the at least one first chain 50. This driver 56 is connected to the at least one first chain 50 and is fixed thereto.

The slide 43 is supported by the frame 42 and can be moved in and against the direction of the arrow 90 relative to the frame 42 and to the undercarriage 41. In order to move the slide 43, the motor 55 arranged on the frame 42 acts on a second chain 51. Here, the motor 55 is fixed to the frame 42, and the second chain 51 is fixed to the slide 43, wherein the second chain 51 is secured to the slide 43 by means of two chain tensioners 54.

If the second chain 51 is moved by the motor 55 and therefore the slide 43 is displaced in relation to the frame 42, the at least one first chain 50 fixed to the frame 42 moves in relation to the slide 43. These two movements are coupled with one another. Due to the described gear arrangement comprising the motor 55 for moving the slide and the driver 56, the driver is moved relative to the slide 43 when the slide 43 is displaced relative to the frame 42.

If the slide 43 is displaced in the direction of the arrow 90 in relation to the frame 42, the driver 56 secured to the at least one first chain 50 thus moves in an anticlockwise direction around the slide 43. If the slide 43 is displaced against the direction of the arrow 90 in relation to the frame 42, for example from the position shown in FIG. 7A into the position shown in FIG. 7B, the driver 56 secured to the at least one first chain 50 moves around the slide 43 in a clockwise direction.

In the position shown in FIG. 7B the driver 56 arranged on the at least one first chain 50 of the driver carriage 4 engages the driver 33 arranged on the transport device 31, wherein the drivers 33, 56 form a coupling device 60. The drive carriage 4 and the transport device 31 are coupled to one another by means of the coupling device 60. If the slide 43 is displaced from the position shown in FIG. 7B further against the direction of the arrow 90 in relation to the frame 42, the driver 56 moves further around the slide 43 in a clockwise direction. The driver 56 and therefore the coupling device 60 then moves—as visible from the illustration—against the arrow direction 90. In the case of such a movement against the arrow direction 90, the transport device 31 is entrained by the coupling device 60.

If, as is shown in FIG. 7B, the driver 56 arranged on the at least one first chain 50 of the drive carriage 4 engages the driver 33 arranged on the transport device on a side shown to the right in the drawing, the transport device 31 can thus be displaced to the left by means of the drive carriage 4. If the driver 56 arranged on the at least one first chain 50 of the drive carriage 4 engages the driver 33 arranged on the transport device 31 on the left side, the transport device 31 can thus be displaced to the right by means of the drive carriage 4 (see movement sequence from FIG. 6A, via FIG. 6B, into FIG. 6C).

If the direction in which the transport device 31 is to be moved by the drive carriage 4 is reversed, the driver 56 arranged on the at least one first chain 50 of the drive carriage 4 must be able to grasp the driver 33 arranged on the transport device 31 from the other side. For a direction reversal, the drivers 33 and 56 of the coupling device 56 must first be decoupled, so that the driver arranged on the drive carriage 4 can be moved in the decoupled state.

FIGS. 8A and 8B show a drive carriage 4 which enables a particularly efficient coupling and decoupling of the coupling device 60. In accordance with the example shown here, the drive carriage 4 and the transport device 31 can be coupled and decoupled in an efficient way. This is implemented in that the frame 42 of the drive carriage 4 is mounted so as to be displaceable vertically in relation to the undercarriage 41 of the drive carriage 4. A drive 46 is provided on the undercarriage 41, with the aid of which drive the frame 42 can be moved vertically relative to the undercarriage 41, i.e. in and against the direction of the arrow 91. Here, the slide 43 and the driver 56 are also moved vertically jointly with the frame 42.

FIG. 8A shows the frame 42 in a first position, which is higher than the position of the frame 42 shown in FIG. 8B. In the position shown in FIG. 8A, the frame 42 and the slide 43 are positioned in a manner moved vertically upwardly. In the position shown in FIG. 8B, the frame 42 and the slide 43 are positioned in a manner moved vertically downwardly. In the position shown in FIG. 8B, the driver 56 arranged on the drive carriage 4 can grasp a driver 33 of the transport device 31 when moved in the horizontal direction so as to push the transport device 31.

When the driver 56 arranged on the drive carriage 4 is in a position that has no vertical overlap with the driver 33 of the transport device 31, the drive carriage 4 can be moved along the drive rail 13 relative to the transport device 31, without also entraining the transport device 31. A position of this type of the driver 56 can be present for example when the driver 56 arranged on the drive carriage 4 is moved vertically upwardly jointly with the slide 43 and the frame 42, as shown in FIG. 8A. On account of the vertical offset, the drivers 56, 33 then cannot form a coupling device 60. A position of this type of the driver 56 can also be present for example when the driver 56 arranged on the driver carriage 4 has been moved by means of the at least one first chain 50 from the underside of the slide 43 into a position laterally of the slide 43, as is shown for example in FIG. 7A, or into a position above the slide 43.

FIGS. 9A, 9B, 9C show a drive carriage 4, which is movable with facilitation of rollers 45 on a drive rail 13. A slide 43 is provided in the lower region of the frame 42 of the drive carriage 4. The slide 43 is supported by the frame 42 with facilitation of rollers 57. By means of a gear arrangement, the slide can be moved relative to the frame 42 in and against the direction of the arrow 90. At least one chain 50 is provided, which is arranged movably on the slide 43 with facilitation of deflection rollers 52, wherein the deflection rollers 52 guide the at least one chain 50 around the slide 43. The at least one chain 50 is fixed to the frame 42 of the drive carriage 4. A driver 56 is arranged on the chain 50 and is entrained with said chain 50.

The slide 43 can be displaced by means of a rack-and-pinion gear in and against the direction of the arrow in relation to the frame 42. In the shown example the rack-and-pinion gear comprises a gearwheel 61, which is connected to the frame 42 and which engages with a rack 62 connected to the slide 43.

The rack 62 and the slide 43, to which the rack 62 is fixed, are displaced by means of the rack-and-pinion gear from the position shown in FIG. 9A, via the position shown in FIG. 9B, into the position shown in FIG. 9C in the direction of the arrow 90 in relation to the frame 42. Here, the chain 50 moves in an anticlockwise direction around the slide, wherein the driver 56 is entrained.

At the same time, the driver 56 is also displaced from the position shown in FIG. 9A, via the position shown in FIG. 9B, into the position shown in FIG. 9C in the direction of the arrow 90 in relation to the frame 42. It can be seen from the drawings that, with this movement sequence, the path over which the driver 56 is displaced is greater than the path over which the slide 43 is displaced. In the shown example the driver 56 is moved twice as far as the slide 43.

The transport device 31 embodied in a suspending manner by way of example in FIGS. 1 to 3 can also be embodied so as to be standing. Standing means, for example, that the transport device is supported by a carriage which runs on the ground and/or is guided on a rail system arranged on the ground. In this context it may be advantageous, in particular with an embodiment with a rack-and-pinion gear according to FIGS. 9A, 9B, 9C, to design the driver 56 provided on the drive carriage 4 in such a way that this driver 56 can be coupled to the transport device with the aid of a rod, for example with a coupling rod.

Both the gear arrangement described by way of example with reference to FIGS. 6A, 6B, 6C and that described by way of example with reference to FIGS. 9A, 9B, 9C have form-locked gear elements, such as the chains 50, 51, the gearwheel 61, and the rack 62.

In the case of the gear arrangements described by way of example with reference to FIGS. 6A, 6B, 6C and with reference to FIGS. 9A, 9B, 9C, the driver 56 moved relative to the undercarriage 41 of the drive carriage 4 can be moved from a middle position according to FIG. 6B or FIG. 9B both in the direction of the arrow 90, for example into a position according to FIG. 6C or 9C, and against the direction of the arrow 90, for example into a position according to FIG. 6A or 9A. The drive carriage 4 can thus be used particularly efficiently in an industrial facility. The drive carriage 4 can thus transfer, without retrofitting measures, the supporting carriage 3 and transport devices 31 from a first facility area both into a further facility area 82, which is arranged on a first side of the first facility area 81, and can transfer transport devices 31 into a further facility area 82, which is arranged on a side of the first facility area 81 opposite the first side. In this respect, see in particular also the further facility areas 82 shown in FIG. 1. It may be particularly advantageous when the gear arrangements, as shown for example in FIGS. 6A, 6B, 6C and FIGS. 9A, 9B, 9C, are constructed so as to be functionally symmetrical.

If items to be transported 32 are displaced from a starting position, corresponding for example to their position according to FIG. 1, in the direction of the arrow 90 into a further facility area 82, the path covered by the items to be transported 32 from the starting position into an end position following transfer into the further facility area 82 is greater than the path covered by the drive carriage 4.

In the exemplary embodiments explained above the transfer bridge 83 can always receive just one supporting carriage 3 with the items to be transported 32. If, by way of example, a supporting carriage 3 has been conveyed out from the interior 85 of the dryer 84, which is shown in FIG. 2, after completion of the drying process, the supporting carriage 3 received by the transfer bridge 83 must firstly be moved on the rail system 77 in order to deliver the supporting carriage 3 to another point and, after this, receive a further supporting carriage 3 with untreated items to be transported 32 and bring said carriage to the dryer 84. Changeover breaks are thus created when the items to be transported are replaced, in which breaks the dryer 84 is temporarily unloaded, said breaks potentially extending over a considerable period of time.

In order to be able to make such a changeover of items to be transported 32 quicker and in order to shorten the changeover breaks, the transfer bridge 83 can comprise two supporting rails 11a and 11b and can guide two transport devices 31a, 31b, as is shown in two exemplary embodiments in FIGS. 10 to 12 and 13 to 15. There, components and parts which have already been described above are provided with the same reference signs, wherein, for the sake of clarity, only the essential components and parts have been provided with reference signs.

The two supporting rails 11a, 11b run parallel to one another and are mounted in the exemplary embodiments shown here on the support 5 whilst maintaining a distance. The drive rail 13 for the drive carriage 4 runs centrally between the supporting rails 11a, 11b and parallel thereto, and said drive carriage is in this way flanked on both sides by the supporting rails 11a, 11b.

The drive carriage 4 cooperates with both supporting rails 11a, 11b or the supporting carriages guided thereon, which are designated in FIGS. 10 to 15 by 3a and 3b.

In contrast to the situation shown with the drive carriage 4 according to FIGS. 1 to 9, the drive carriage 3 now has two drivers 56a, 56b, which each protrude outwardly from the chains 50, which are in turn coupled by a connection member 92, which runs coaxially to the drivers 56a, 56b.

The frame structure 42 of the drive carriage 4 is mounted so as to be movable horizontally in relation to the undercarriage 41 of said drive carriage.

Figure 10:
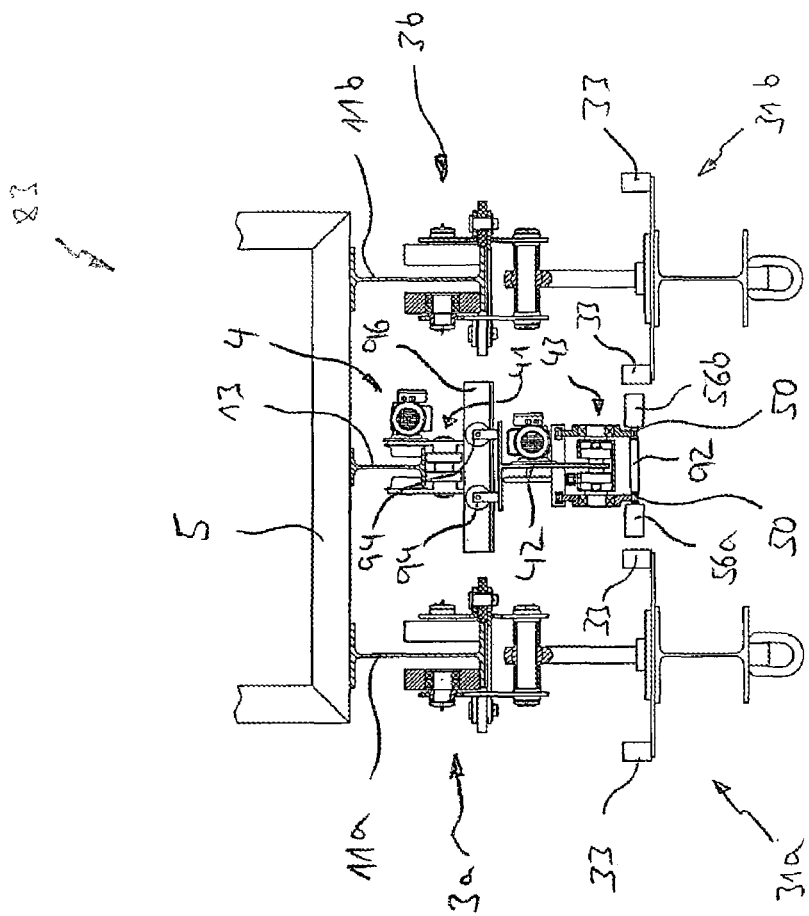
FIGS. 10 to 12 each show the sections corresponding to FIG. 4 of a further exemplary embodiment in which the transport system comprises two parallel supporting rails with supporting carriage and a modified drive carriage.
Figure 11:
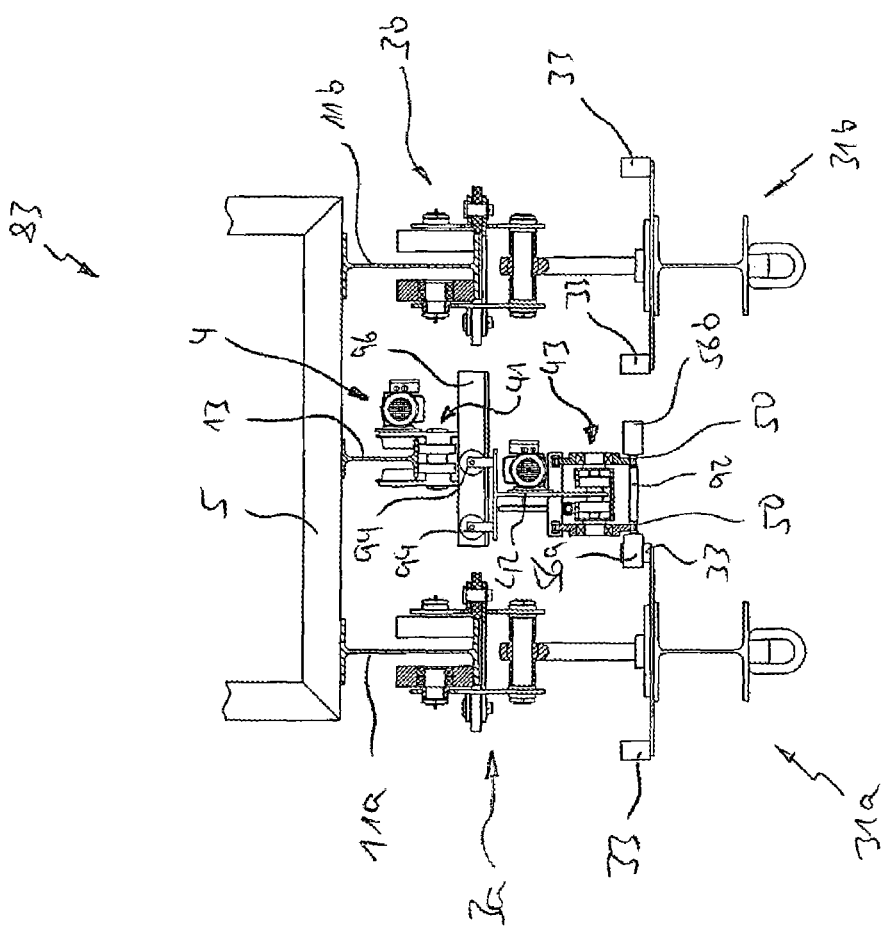
Figure 12:
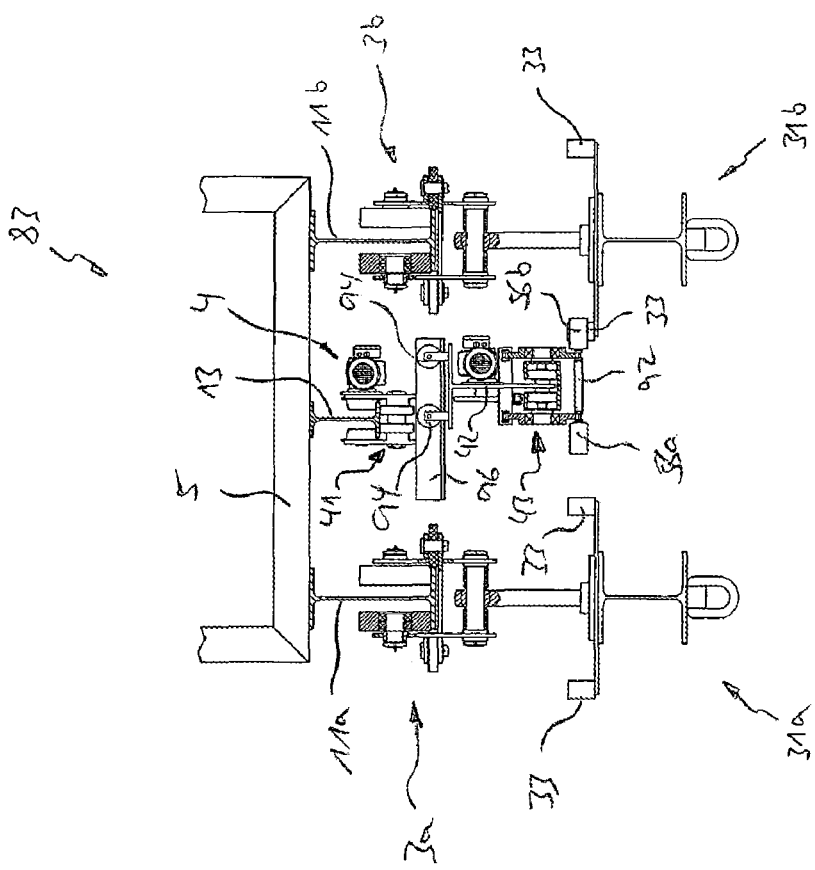

In the exemplary embodiment according to FIGS. 10 to 12, the frame structure 42 is mounted so as to be displaceable in relation to the undercarriage 41 horizontally and transversely relative to the two supporting rails 11a, 11b. In practice, the frame structure 42 is mounted so as to be displaceable in relation to the undercarriage 41 horizontally and at right angles to the two supporting rails 11a, 11b. For this purpose, the frame structure 42 is guided by means of running rollers 94 in a rail piece 96, which is supported by the undercarriage 41 and runs perpendicularly to the supporting rails 11a, 11b in the horizontal.

The frame structure 42 and the slide 43 can be displaced in the rail piece 96 by means of a motor (not shown separately). In this way, the frame structure 42 with the slide 43 can cooperate selectively with a corresponding driver 33 of the supporting carriage 3a in the supporting rail 11a or the supporting carriage 3b in the supporting rail 11b, as is illustrated in FIGS. 11 and 12.

Whilst an item is disposed for example on a supporting carriage 3b in the dryer 84, the supporting rail 11a of the transfer bridge 83 can now receive a supporting carriage 3a which is loaded with items to be transported 32 that are to be dried. The transfer bridge 83 then passes to the dryer 84, where the dried items to be transported 32 can be conveyed from the interior 85 of said dryer to the supporting rail 11b, which is still free, of the transfer bridge 83. Here, the frame structure 42 and the slide 43 are positioned on the rail piece 94 such that the driver 56b can come into engagement with the driver 33 of the supporting carriage 3b in the dryer 84.

When the supporting rail 11b has now received the supporting carriage 3b, the frame structure 42 of the drive carriage 4 is moved in the direction of the supporting rail 11a so that the driver 56a of the drive carriage 4 can cooperate with the driver 33 of the supporting carriage 3a there. The supporting carriage 3a is then conveyed into the dryer 84.

With the drying process underway, the supporting carriage 3b previously conveyed out from the dryer 84 can now be fed to its further purpose, and the transfer bridge 83 can receive a new supporting carriage 3a with items to be transported 32 that are to be dried, after which the cycle can be repeated.

So that the supporting carriages 3a, 3b do not move when they are received by the supporting rail 11a or 11b and are not engaged with the driving carriage 4, each supporting carriage 3a, 3b cooperates with a locking system (not shown separately) on the supporting rails 11a, 11b, by means of which the supporting carriages 3a, 3b can be held in their position on the corresponding supporting rail 11a, 11b.

Figure 13:
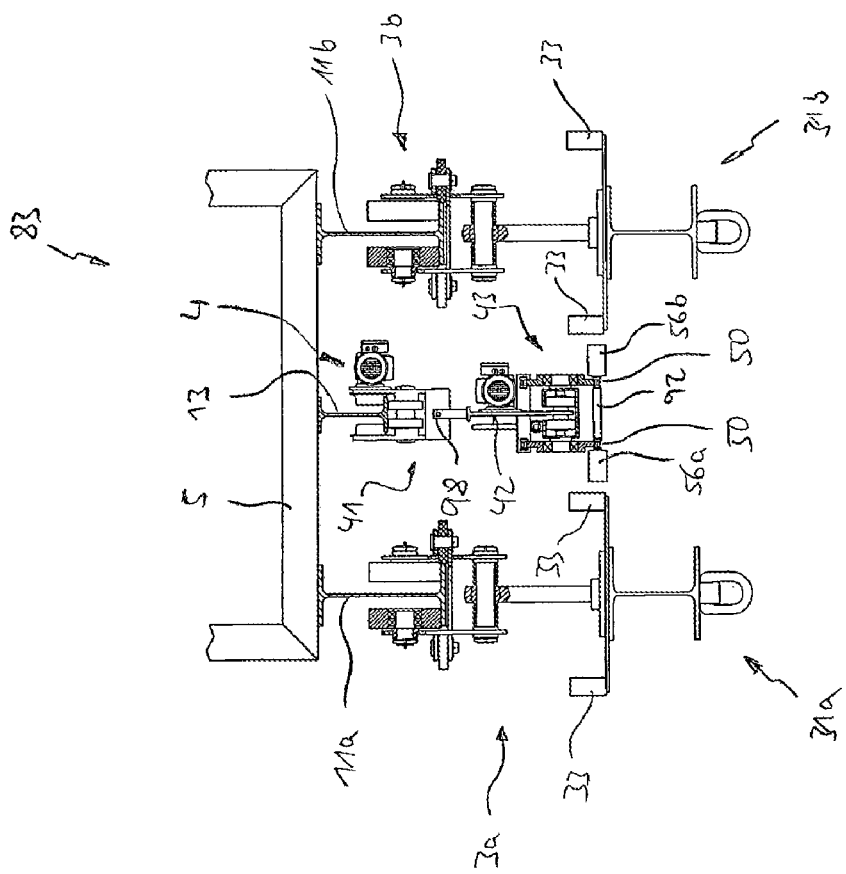
FIGS. 13 to 15 each show the sections corresponding to FIG. 4 of a further exemplary embodiment in which the transport system comprises two parallel supporting rails with supporting carriage and a drive carriage that has been modified once again.
Figure 14:
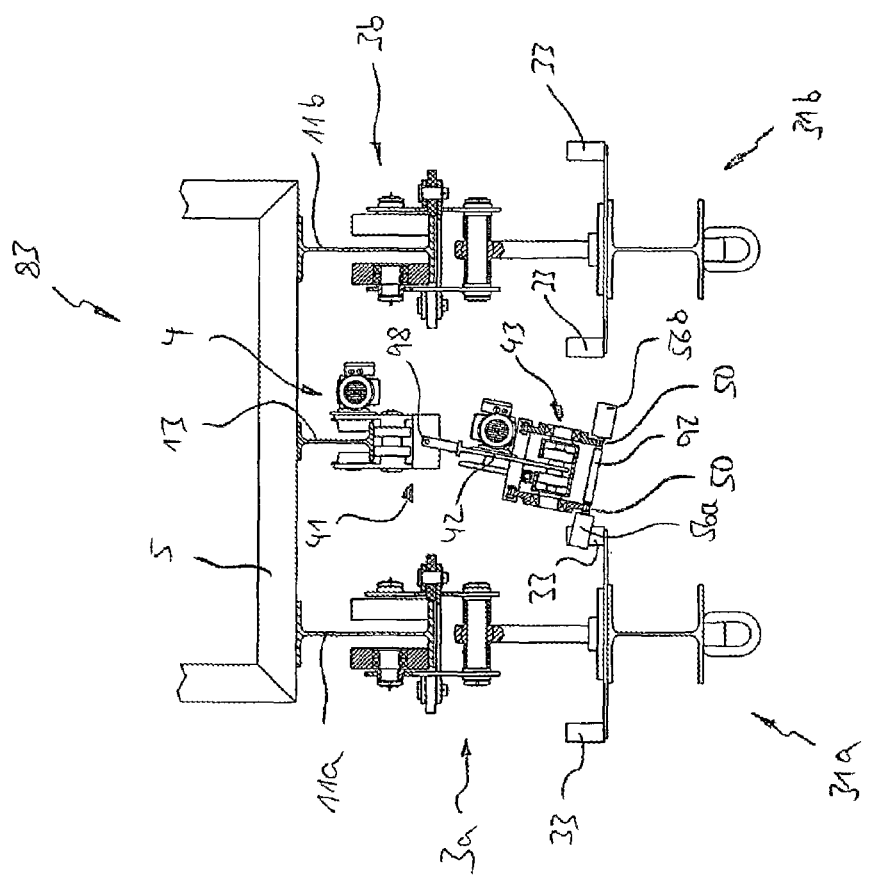
Figure 15:
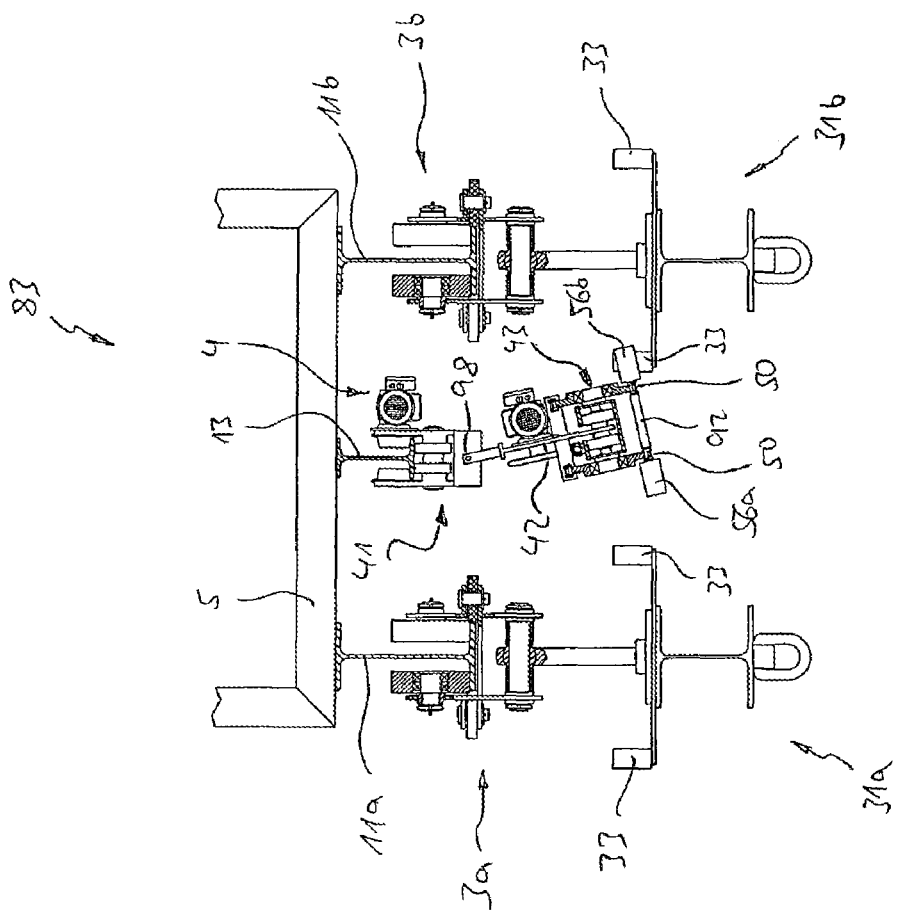

FIGS. 13 to 15 show a further exemplary embodiment, in which the frame structure 42 with the slide 43 is not displaceable in the horizontal, but is mounted on the undercarriage 41 of the drive carriage 4 so as to be pivotable about a pivot axis 98. This pivot axis 98 runs in the horizontal and parallel to the supporting rails 11a, 11b. The frame structure 42 can be pivoted by means of a drive (not shown separately) selectively in the direction of the supporting rail 11a or the supporting carriage 3a guided there or in the direction of the supporting rail 11b or the supporting carriage 3b guided there, whereby the corresponding driver 56a, 56b can cooperate with the driver 33 of the supporting carriage 3a or 3b to be conveyed, as shown in FIGS. 13 and 14.

A concept that is essential to the invention can be summarized as follows: The present invention relates to a drive carriage 4 for a transport device 31 comprising an undercarriage 41, comprising a frame 42, comprising a slide 43, and comprising at least one driver 56, wherein the drive carriage 4 can be moved by means of the undercarriage 41 along a drive rail 13, wherein the frame 42 is connected to the undercarriage 41, wherein the slide 43 is supported by the frame 42, wherein the driver 56 can be coupled to the transport device 31, and wherein both the slide 43 and the driver 56 are displaceable relative to the frame 42. The invention also relates to a transport system comprising a drive carriage 4 of this type and comprising at least one transport device 31 for an item to be transported 32, wherein the transport device 31 comprises one or more, preferably at least two supporting carriages 3 and a driver 33, which can be coupled to the driver 56 of the drive carriage 4. The driver 33 of the transport device and the driver 56 of the drive carriage 4 form a coupling device 60 in the coupled state. A drive carriage 4 and a transport system 31 that have a low susceptibility to faults and a high availability are provided in this way. Furthermore, an at least largely continuous operation and smaller cycle times can be made possible.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A drive carriage for a transport device comprising:
an undercarriage, by means of which the drive carriage is movable along a drive rail, wherein
a) the drive carriage has a frame structure connected to the undercarriage, a slide supported by the frame structure, and at least one driver which can be coupled to the transport device, the at least one driver being mounted on the slide in such a way that the at least one driver can be moved relative to the slide and the at least one driver is connected to at least one chain, which is guided movably around the slide and is fixed to the frame structure;
b) the slide and the at least one driver are mounted so as to be displaceable in relation to the frame structure;
c) the drive carriage is guided by the drive rail; and
d) the transport device is supported by at least one supporting carriage, and the at least one supporting carriage is guide by a supporting rail, the supporting rail being spaced apart from the drive rail.

2. The drive carriage as claimed in claim 1, wherein the at least one driver is mounted so as to be displaceable in relation to the frame structure and parallel to the drive rail.

3. The drive carriage as claimed in claim 1, wherein a gear arrangement for moving the at least one driver is provided, by means of which the at least one driver can be moved in two movement directions opposite to one another, wherein the gear arrangement is functionally symmetrical in respect of the movement directions of the at least one driver.

4. The drive carriage as claimed in claim 1, wherein a gear arrangement having a motor for moving the slide and the at least one driver is provided and is designed in such a way that the at least one driver is moved relative to the slide when the slide is displaced relative to the frame structure.

5. The drive carriage as claimed in claim 1, wherein a rack-and-pinion gear is provided in order to displace the slide in relation to the frame structure.

6. The drive carriage as claimed in claim 5, wherein the rack-and-pinion gear has a gearwheel on the side of the frame structure and has a rack on the side of the slide.

7. The drive carriage as claimed in claim 1, wherein a gear having a chain connected to the slide is provided in order to move the slide in relation to the frame structure and is fixed to the slide.

8. The drive carriage as claimed in claim 1, wherein the frame structure is mounted so as to be vertically displaceable in relation to the undercarriage.

9. The drive carriage as claimed in claim 1, wherein the frame structure is mounted so as to be movable horizontally in relation to the undercarriage.

10. The drive carriage as claimed in claim 9, wherein the frame structure is mounted so as to be displaceable horizontally in relation to the undercarriage or so as to be pivotable in relation to the undercarriage about a horizontal pivot axis.

11. A transport system comprising:
a drive carriage and at least one transport device for items to be transported, wherein
a) the transport device is supported by at least one supporting carriage, the at least one supporting carriage having at least four supporting rollers, wherein the axes of the at least four supporting rollers are arranged parallel and offset to one another;
b) the drive carriage comprising a frame structure connected to an undercarriage, a slide supported by the frame structure, and at least one driver which can be coupled to the transport device;

c) a supporting rail, the at least one supporting carriage being guided by the supporting rail; and
d) a drive rail spaced apart from the supporting rail, the drive carriage being guided by the drive rail.

12. The transport system as claimed in claim 11, wherein the at least one supporting carriage has at least four guide rollers, wherein axes of the at least four guide rollers are arranged parallel and offset to one another.

13. The transport system as claimed in claim 11, wherein the transport device is suspended in a hinged manner from at least two supporting carriages.

14. The transport system as claimed in claim 11, wherein the at least one primary rail system comprises two supporting rails, which run parallel to one another, wherein the frame structure of the drive carriage is mounted so as to be movable horizontally relative to the two supporting rails.

15. The transport system as claimed in claim 14, wherein the frame structure of the drive carriage is mounted so as to be displaceable horizontally and transversely, in particular horizontally and at right angles to the two supporting rails or so as to be pivotable about a pivot axis which runs parallel to the two supporting rails.

16. A transport system comprising:
a drive carriage and at least one transport device for items to be transported, wherein
a) the transport device is supported by at least one supporting carriage, the at least one supporting carriage having at least four guide rollers, wherein axes of the at least four guide rollers are arranged parallel and offset to one another;
b) the transport device has a driver, which can be coupled to at least one driver of the drive carriage, the drive carriage comprising a frame structure connected to an the undercarriage, a slide supported by the frame structure, and the at least one driver which can be coupled to the transport device;
c) a supporting rail, the at least one supporting carriage being guided by the supporting rail; and
d) a drive rail spaced apart from the supporting rail, the drive carriage being guided by the drive rail.

17. The transport system as claimed in claim 16, wherein the transport device is suspended in a hinged manner from at least two supporting carriages.

18. The transport system as claimed in claim 16, wherein the at least one primary rail system comprises two supporting rails, which run parallel to one another, wherein the frame structure of the drive carriage is mounted so as to be movable horizontally relative to the two supporting rails.

19. The transport system as claimed in claim 18, wherein the frame structure of the drive carriage is mounted so as to be displaceable horizontally and transversely, in particular horizontally and at right angles to the two supporting rails or so as to be pivotable about a pivot axis which runs parallel to the two supporting rails.

* * * * *